United States Patent [19]
Schad et al.

[11] Patent Number: 5,378,139
[45] Date of Patent: Jan. 3, 1995

[54] HOOK NOZZLE FOR INSIDE GATED MOLD

[75] Inventors: Robert D. Schad, Toronto; Harald Schmidt, Georgetown, both of Canada

[73] Assignee: Husky Injection Molding Systems Ltd., Bolton, Canada

[21] Appl. No.: 116,965

[22] Filed: Sep. 7, 1993

[51] Int. Cl.⁶ .............................................. B29C 45/22
[52] U.S. Cl. .................. 425/549; 264/328.8; 264/328.15; 425/570; 425/573; 425/577
[58] Field of Search ............... 425/549, 570, 573, 577; 264/328.8, 328.15

[56] References Cited

U.S. PATENT DOCUMENTS 4,768,945  9/1988  Schmidt et al. .................. 425/549
5,145,630  9/1992  Schad ............................... 264/328.8

FOREIGN PATENT DOCUMENTS 186413  7/1986  European Pat. Off. ............ 425/573

*Primary Examiner*—Tim Heitbrink
*Attorney, Agent, or Firm*—Bachman & LaPointe

[57] ABSTRACT

The present invention relates to an improved apparatus for forming injection molded plastic articles having an inner wall portion. The apparatus includes a mold cavity portion and a mold core portion defining a cavity space in the shape of the plastic article to be formed. The apparatus further includes at least two hot runner nozzles for injecting molten plastic material into the cavity space. The nozzles are preferably offset to outer portions of the mold core portion so as to provide an increased space in the mold core portion in which cooling conduits, inlets and the like can be placed to increase the cooling capability of the mold core portion. The offsetting of the nozzles also provides the mold core portion with increased strength. Each of the nozzles communicates with inner wall portion of the cavity space via a hook-shaped passageway and an inside gate. Additionally, each of the nozzles has a metal portion for maintaining plastic material in the hook-shaped passageway in molten condition.

15 Claims, 4 Drawing Sheets

HOOK NOZZLE FOR INSIDE GATED MOLD

BACKGROUND OF THE INVENTION

The present invention relates to an injection molding apparatus and in particular, to an improved nozzle arrangement which permits the mold core to have an increased cooling capability and increased strength and which allows the fabrication of smaller diameter plastic articles without dangerously sharp edges.

Injection molding systems for forming plastic articles typically use hot runner nozzle arrangements to inject molten plastic material into a cavity space. In one type of hot runner nozzle arrangement, a heating element is placed near a center gate or an edge gate through which molten plastic material flows into the cavity space. This type of nozzle arrangement helps maintain the plastic material in the desired molten condition. U.S. Pat. No. 4,768,945 to Schmidt et al. exemplifies such a nozzle arrangement. As shown therein, the nozzle arrangement may include an inclined nose portion for housing a heating element for maintaining the plastic material in a molten condition and a hook-shaped passageway for supplying the molten plastic material to an edge gate.

Some molded plastic articles, such as cups and buckets, have molded lip or rim portions forming a top surface on the article. One of the more serious problems associated with the molding of these articles is the formation of unwanted sharp edges along the top surface and/or the outer edge of the lip or rim portion. This problem has been addressed by using a rim gating technique wherein molten plastic material is first injected into the inside edge of the rim defining portion of the cavity space and then permitted to flow down along the sidewall defining portions of the cavity space. This technique not only addresses the problem of sharp edges but also addresses other undesirable molding problems such as core shifting. U.S. Pat. No. 5,145,630 to Schad, assigned to the assignee of the instant application, illustrates this type of rim gating technique.

While successfully dealing with the core shifting and the edge problems, the Schad system is limited in the size of the articles which it can mold. In particular, it cannot be used to mold articles having an effective diameter below 150 mm. This is in part due to the fact that smaller diameter articles require the mold core to have an increased cooling capability. In the Schad design, the cooling capability of the mold core is limited by the nozzle arrangement. For example, as shown in FIG. 1 herein, which is FIG. 8 in the Schad patent, there exists a dimension A between the hot runner nozzles used to inject molten plastic material into the cavity space. This distance is all that is available for providing cooling means such as cooling inlets, cooling conduits and the like. While it is possible to add cooling means in the space A in the Schad design, the net effect is a reduction in the overall strength of the mold core portion—a reduction which could result in the breakage of the mold core portion.

Accordingly, it is an object of the present invention to provide an injection molding apparatus having an improved nozzle arrangement which allows the fabrication of smaller articles.

It is a further object of the present invention to provide an injection molding apparatus having an improved nozzle arrangement as above which allows the cooling capability of the mold core portion to be enhanced without sacrificing the overall strength of the mold core portion.

It is still a further object of the present invention to provide a rim-gated or edge gated injection molding apparatus having an improved nozzle arrangement as above which eliminates sharp edges along the top surface or outer edge of a molded article.

These and other objects and advantages of the present invention will become clearer from the following description and drawings wherein like reference numerals depict like elements.

SUMMARY OF THE INVENTION

The foregoing objects and advantages are attained by the injection molding apparatus of the present invention. In accordance with the present invention, an apparatus for forming injection molded plastic articles having an inner wall portion is described. The apparatus comprises a mold cavity portion and a mold core portion defining a cavity space in the shape of the plastic article to be formed. The apparatus further comprises nozzle means for injecting molten plastic material into the cavity space. The nozzle means are preferably offset to outer portions of the mold core portion so as to provide an increased space in the mold core portion for means for cooling the molten plastic material. The offsetting of the nozzle means also provides the mold core portion with increased strength.

In an embodiment of the present invention, the nozzle means in the form of at least two hot runner nozzles communicate with respective gates adjacent an inside edge of a rim defining portion via hook-shaped passageways. The nozzle means are positioned partially or substantially wholly under the rim defining portion of the cavity space.

Preferably, each of the hot runner nozzles is formed by a cylindrical body having a metal portion which protrudes beyond the nozzle outlet to a point substantially adjacent the gate. This metal portion is used to conduct heat for maintaining the plastic material in the hook-shaped passageway in a molten state.

The apparatus of the present invention could also be used for the inside gating of parts which are not round or do not have a lip as such, but merely an inside surface, upon which to gate.

Other details and features of the present invention will become clearer from the following description.

DETAILED DESCRIPTION

Figure 1:
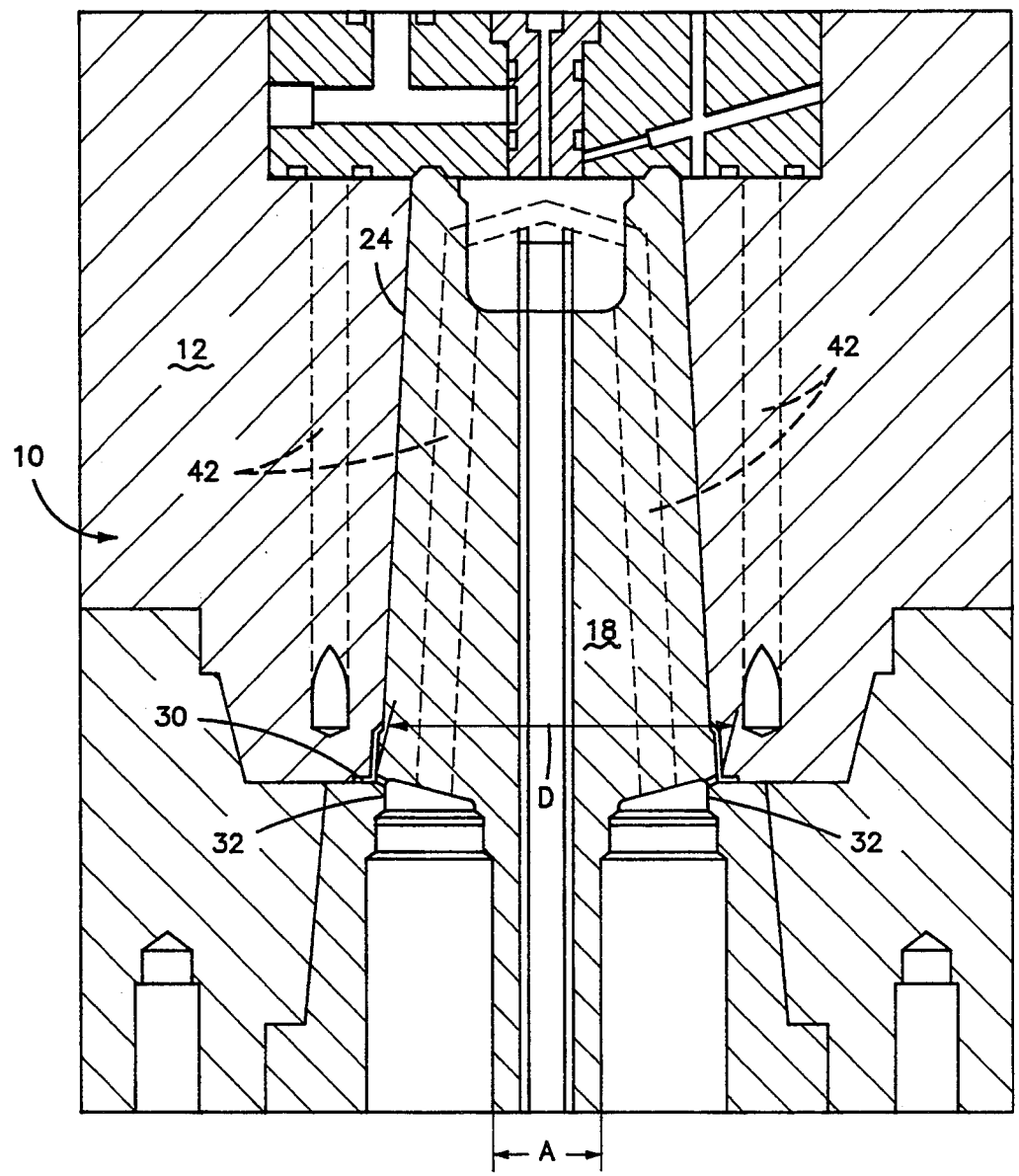
FIG. 1 is a sectional view of a prior art injection molding apparatus employing a rim gating technique.

Referring now to the drawings, FIG. 1 illustrates one embodiment from U.S. Pat. No. 5,145,630 to Schad, which is incorporated by reference herein, of an apparatus 10 for forming injection molded plastic articles having a rim portion. The apparatus 10 includes a mold cavity portion 12, a mold core portion 18, and a cavity space 24 in the shape of the article to be fabricated defined by the mold cavity and mold core portions. As can be seen from the figure, the cavity space 24 has an inner wall portion 30 defining a rim or lip portion.

The apparatus 10 further includes hot runner nozzles 32 for injecting molten plastic material into the rim defining portion 30 of the cavity space. The hot runner nozzles 32 are spaced at a distance A. Cooling passageways 42 in the mold cavity and in the mold core portions are provided to cool and solidify the molten plastic material in the cavity space. Ejection means (not shown) are provided to eject the molded articles from the mold core after the mold cavity and the mold core portions have been moved to a mold open position.

As previously discussed, the molded articles which can be manufactured using this type of molding apparatus are limited to those having a diameter D of about 150 mm. or greater. It is not possible to reduce the diameter D because of the arrangement of the nozzles 32 and the effect of this arrangement on the cooling capability and strength of the mold core portion 18. Below a diameter of 150 mm., the ability to effect cooling in the mold core portion is substantially decreased due to the lack of physical space A between the nozzles 32 for cooling means such as cooling conduits and inlets. Additionally, the mold core portion 18 can be weakened to the point where it could break due to the lack of metal in the area A between the nozzles 32.

Figure 2:
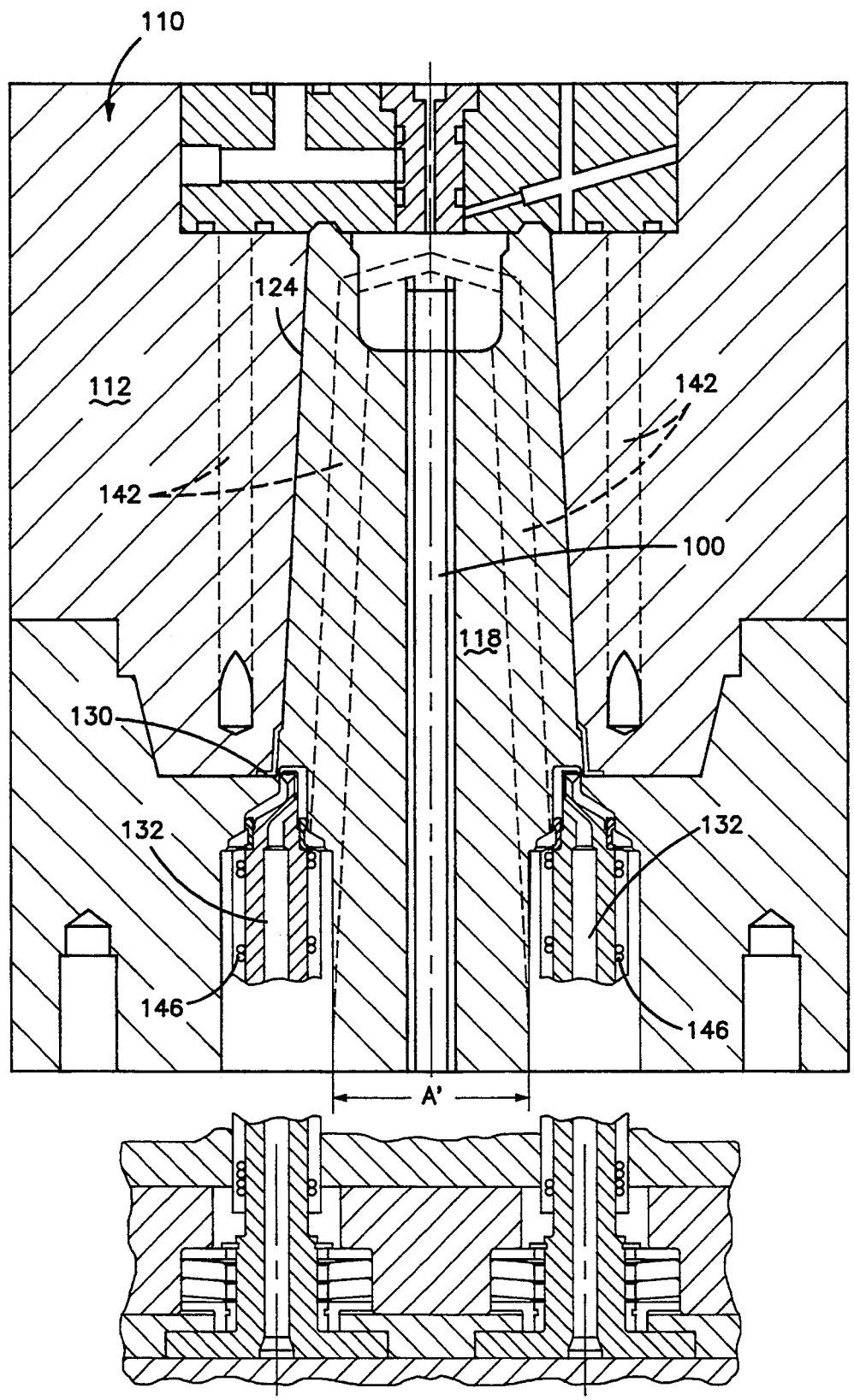
FIG. 2 is a sectional view of the injection molding apparatus of the present invention.

To facilitate the formation of smaller diameter articles, i.e. those having a diameter of about 120 mm. or less, it is necessary to reposition the hot runner nozzles and redesign the way molten material is fed into the rim gates so as to provide additional physical space between the nozzles. FIG. 2 illustrates an injection molding apparatus in accordance with the present invention having a new hot runner nozzle design and additional physical space between the nozzles to accommodate cooling conduits, cooling inlets and the like.

As shown in FIG. 2, the molding apparatus 110 has a mold core portion 118, a mold cavity portion 112, and a cavity space 124 defined by the mold core and cavity portions. The mold core and cavity portions are movable relative to each other between mold closed and mold open positions. Any suitable means (not shown) known in the art may be used to move the mold core and mold cavity portions relative to each other. For example, either the mold core portion or the mold cavity portion may be attached to a moving platen.

The cavity space 124 is preferably in the shape of an article having an inner wall portion 130 which may be part of a rim or lip portion on the article. Hot runner nozzles 132 are provided to inject molten plastic material into the inner wall portion 130 of the cavity space 124. While only two hot runner nozzles 132 have been illustrated, it should be recognized that the apparatus 110 could include more than two hot runner nozzles or even just one nozzle. As will be discussed in more detail hereinafter, each of the hot runner nozzles 132 communicates with a rim or inside gate 134 for feeding molten plastic material into an inside edge 136 of the rim or inner wall portion 130. By providing such a gating arrangement, it is possible to avoid the creation of sharp edges along an upper surface or outer edge of the article being molded.

The apparatus 110 further includes means (not shown) for ejecting solidified plastic articles from the mold core portion when the mold core and mold cavity portions are in a mold open position. The ejecting means may comprise any suitable means known in the art.

The injection molding apparatus 110 of the present invention differs from prior art systems in that the hot runner nozzles 132 are offset. By this, it is meant that the hot runner nozzles have been moved away from the central axis 100 of the mold core portion to outer portions of the mold core portion 118. It has been found that by offsetting the hot runner nozzles, it is possible to significantly increase the physical area A' in which cooling means 142 such as cooling conduits, cooling inlets and the like can be positioned. Additionally, the mold core portion 118 is strengthened by the presence of additional metal in the area A'.

Figure 3:
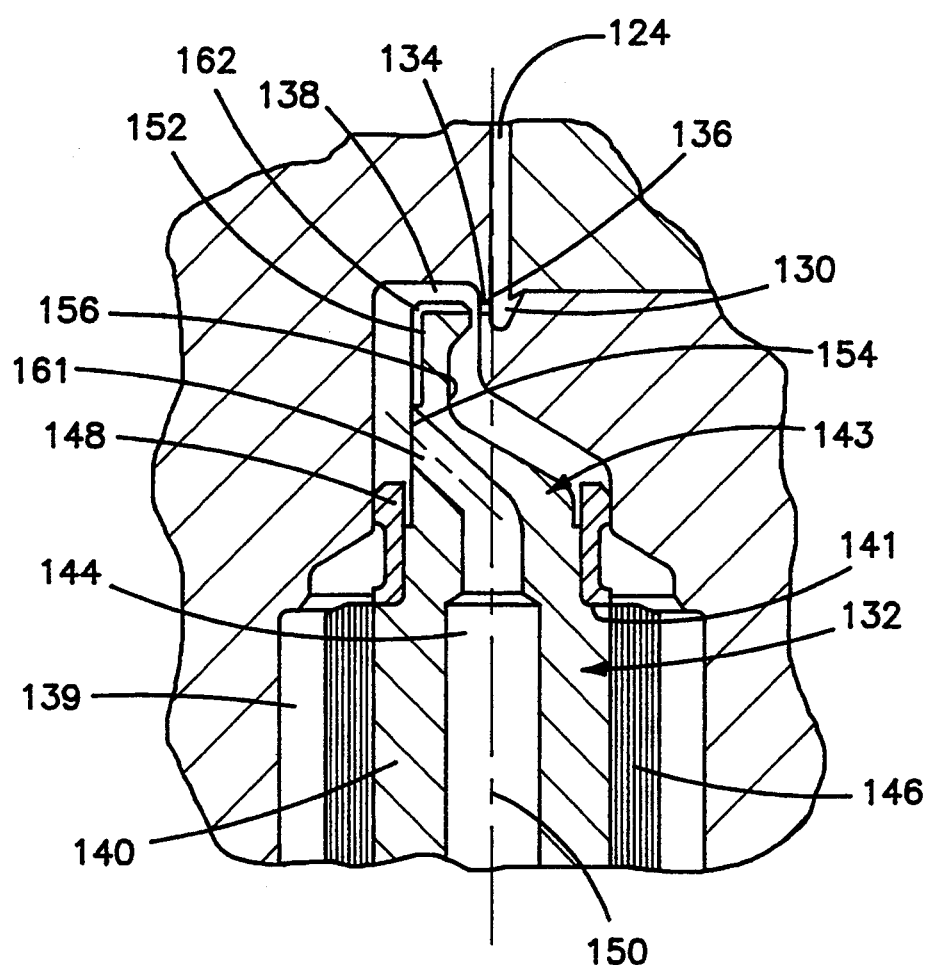
FIG. 3 is a sectional view of a first nozzle arrangement employed in the molding apparatus of FIG. 2.
Figure 4:
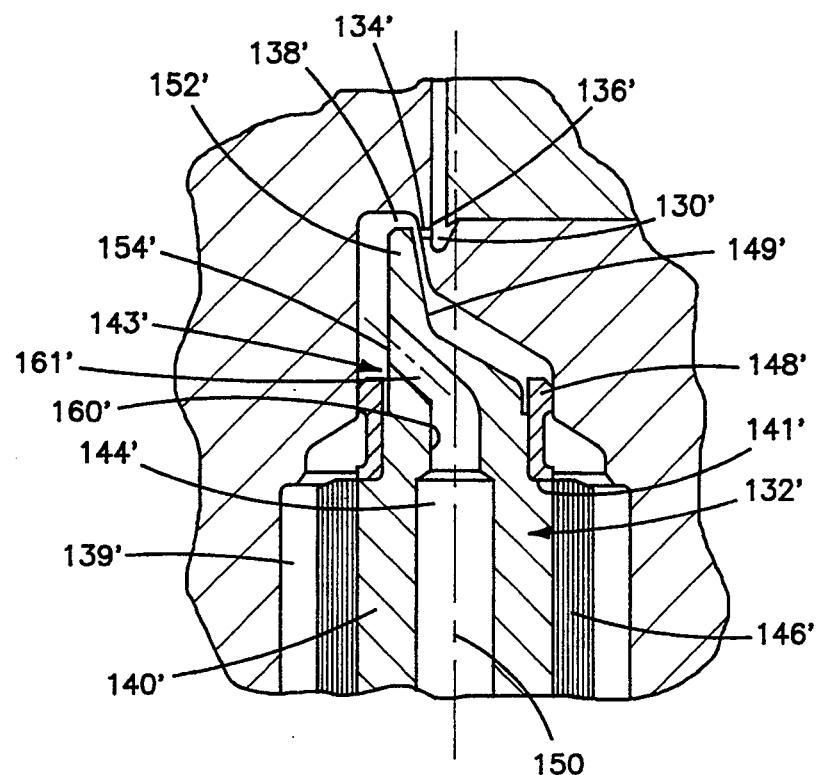
FIG. 4 is a sectional view of a second nozzle arrangement employed in the molding apparatus of FIG. 2.

As can be seen from FIGS. 3 and 4, offsetting the hot runner nozzles 132 means that molten plastic material flowing from a respective hot runner nozzle must travel through a hook-shaped passageway 138 into the rim or inside gate 134 and then into the mold cavity space 124. The hook-shaped passageway 138 is defined by a bore 139 in the mold core portion 118 in which the hot runner nozzle is inserted and the configuration of the cylindrical body 140 forming the hot runner nozzle.

As shown in FIG. 3, the hot runner nozzle 132 comprises a cylindrical body 140 having a central passageway 144 and a central axis 150. A passageway 161, angled with respect to central passageway 144, is provided to connect the passageway 144 to the hook shaped passageway 138. The hot runner nozzle 132 is preferably arranged in this embodiment so that the central axis 150 is substantially aligned with the inside edge 136 of the inner wall portion 130.

The cylindrical body 140 is formed from a heat conducting metallic material such as beryllium copper and is preferably surrounded by heating coil(s) 146. An annular collar 148 is provided to locate and position the body 140 within the bore 139. The collar 148 is preferably located adjacent a tip 143 of the hot runner nozzle and has an inner diameter substantially equal to the outer diameter of the nozzle tip. It is preferably formed from stainless steel, titanium-based metal, or any other material having low thermal conductivity. In addition to locating the body 140, the collar 148 serves as a thermal insulator and as a seal against any unwanted flow of the plastic material. If desired, the cylindrical body 140 may be provided with a ledge 141 for seating the collar 148.

As can be seen from this Figure, the body 140 has a metal portion 152 which extends above the outlet opening 154 of the passageway 161 to a point substantially aligned with the gate 134. If desired, the portion 152 may have one or more grooves 162 to channel plastic flow to the gate 134. The primary purpose of the portion 152 is to conduct heat generated by the heating coil(s) 146 so that any plastic material within the hook-shaped passageway 138 is maintained in a molten condition.

If desired, the portion 152 may also have a curved section 156 that helps direct the flow of molten plastic material into the gate 134.

FIG. 4 shows an alternative embodiment of the hot runner nozzle 132' wherein the inside edge 160' of the central passageway 144' is substantially aligned with the inside edge 136' of the inner wall portion of the cavity space. As a consequence, the hot runner nozzle 132' is substantially wholly beneath the inner wall portion 130' of the cavity space and still further offset from the central axis 100 of the mold core portion.

As in FIG. 3, the hot runner nozzle 132' shown in FIG. 4 is formed from a metallic cylindrical body 140' having a central passageway 144' and having one or more heating coils 146' surrounding the body. The hot runner nozzle 132' has a tip 143'. The hot runner nozzle 132' is positioned within a bore 139' in the mold core portion and maintained in place by the annular collar 148' seated on ledge 141'.

The cylindrical body 140' also has a metal portion 152' which extends above the outlet opening 154' of the angled passageway 161' to a point substantially adjacent the rim or inside gate 134'. The metal portion 152' is used to conduct heat generated by the heating coil(s) 146' for maintaining the plastic material within the passageway 138' in a molten state. Unlike the metal portion in FIG. 3, the metal portion 152' does not have a curved section. Instead, it has a tapered configuration with an angled edge 149'.

Figure 5:
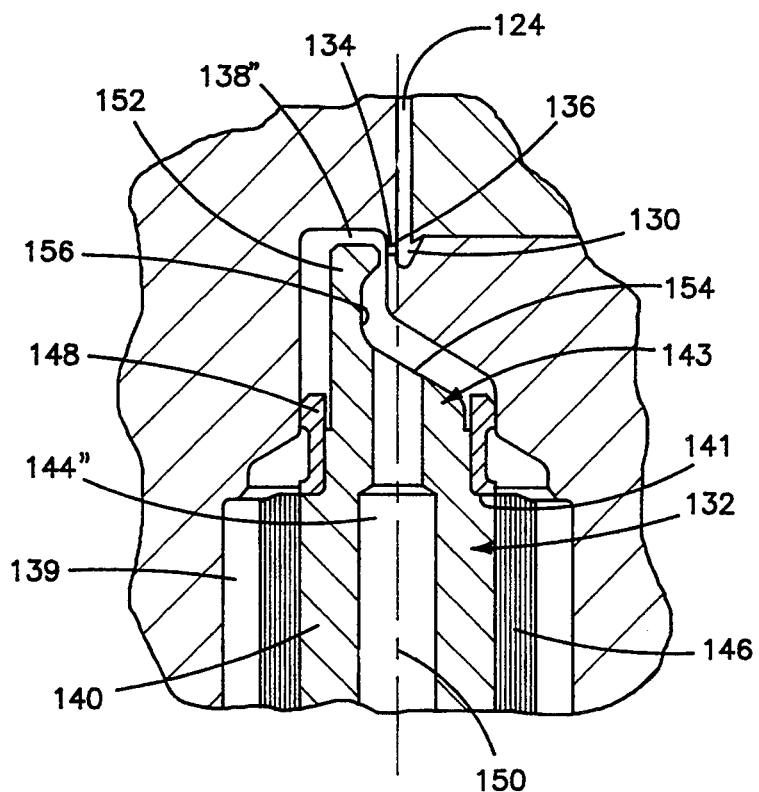
FIG. 5 is a sectional view of a third nozzle arrangement employed in the molding apparatus of FIG. 2.

FIG. 5 illustrates yet another embodiment for the hot runner nozzle. This embodiment differs from the embodiment of FIG. 3 in that angled passageway 161 is omitted. Instead, plastic material flows into the passageway 138" directly from the central passageway 144". The remaining features in this figure are substantially identical to those in FIG. 3.

A nozzle of the design shown in FIG. 3 has also been found to be advantageous due to the fact that the plastic flow path approaches the gate from the back side of the portion 152. This provides an insulative value over the design shown in FIG. 5 where the hot plastic flow path is directly adjacent the mold cavity. This area is inherently cooler in the FIG. 3 design as the inactive area of plastic occupation allows the molded article to cool sooner in the area which is typically the warmest, improving the cycle time.

As previously discussed, offsetting the hot runner nozzles in the manner of the present invention increases the physical space in which cooling means such as cooling conduits 142 can be placed in the mold core portion. As a result, the mold core portion has increased cooling capability. In addition, there is additional metal present in the space A' between the hot runner nozzles. The presence of this additional metal helps strengthen the mold core portion. Still further, and most important, offsetting the hot runner nozzles as shown in the present invention facilitates the fabrication of smaller diameter articles.

It is apparent that there has been provided in accordance with this invention a hook nozzle for an inside gated mold which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An apparatus for injection molding plastic articles having an inner wall portion, said apparatus comprising:
   a mold cavity portion;
   a mold core portion defining a cavity space in the shape of a plastic article to be molded with said mold cavity portion;
   said cavity space having a first portion defining said inner wall portion;
   nozzle means for injecting molten plastic material into said inner wall portion;
   a gate communicating with an inside edge of said inner wall portion;
   a hook-shaped passageway in said mold core portion between said nozzle means and said gate for carrying molten plastic material between said nozzle means and said gate;
   said nozzle means being offset with respect to a center line of said mold core portion as a result of said hook-shaped passageway; and
   said apparatus having enhanced core strength and an enlarged area for cooling channels as a result of said offset of said nozzle means.

2. The apparatus of claim 1 further comprising an annular collar within said passageway, said annular collar acting as a seal and a thermal insulator and serving to position said nozzle means within said mold core portion.

3. The apparatus of claim 2 wherein said collar is formed from a material having a low thermal conductivity.

4. The apparatus of claim 1 further comprising said nozzle means being formed by at least one cylindrical body having an internal central passageway, an outlet passageway communicating with said central passageway, and an outlet opening for said outlet passageway, said at least one body including a metal portion extending beyond said outlet opening to a point substantially adjacent said gate, and said metal portion acting as a heating element for maintaining said plastic material in said passageway in a molten condition.

5. The apparatus of claim 4 wherein said outlet passageway is angled relative to said central passageway.

6. The apparatus of claim 4 wherein said metal portion has a curved edge which defines a portion of said hook-shaped passageway.

7. The apparatus of claim 4 wherein said internal central passageway has a central axis which is substantially aligned with the inside edge of said inner wall portion.

8. The apparatus of claim 4 wherein said nozzle means is positioned substantially under said inner wall portion.

9. The apparatus of claim 4 wherein said nozzle means comprises at least one hot runner nozzle.

10. An apparatus for forming injection molded plastic articles having an inner wall portion, said apparatus comprising:
    a mold cavity portion and a mold core portion;
    said mold cavity portion and said mold core portion defining a cavity space in the shape of a plastic article to be formed;
    said mold core having a centerline;
    said inner wall portion being defined by a portion of said cavity space and being spaced from said centerline by a first distance;
    nozzle means for injecting molten plastic material into said cavity space at said inner wall portion; and
    said mold core portion having an enlarged area available for accommodating means for cooling molten plastic material in said cavity space, said enlarged area being provided by offsetting said nozzle means with respect to said centerline by a second distance greater than said first distance.

11. The apparatus of claim 10 further comprising:

said cavity space having at least two inner wall portions;

said nozzle means being formed by at least two spaced apart hot runner nozzles; and each of said hot runner nozzles being positioned substantially entirely under one of said at least two inner wall portions of said cavity space.

12. The apparatus of claim 11 further comprising:

at least two gates communicating with inside edges of said inner wall portions; and each of said hot runner nozzles communicating with one of said at least two gates via a hook-shaped passageway.

13. The apparatus of claim 12 further comprising:

each said hot runner nozzle comprising a cylindrical body having an internal central passageway, an outlet passageway communicating with said central passageway and an outlet opening;

said outlet passageway being angled relative to said central passageway;

said cylindrical body being surrounded by at least one heating coil;

said cylindrical body having a metal portion extending beyond said outlet opening to a position substantially adjacent a respective one of said gates; and said metal portion transmitting heat generated by said at least one heating coil to said molten plastic material in said passageway.

14. The apparatus of claim 13 wherein said metal portion has a curved edge portion.

15. The apparatus of claim 12 further comprising:

said mold core portion having at least two bores for receiving said hot runner nozzles;

an annular collar surrounding a portion of each said hot runner nozzle; and said annular collar positioning a respective one of said hot runner nozzles in a respective one of said bores.

* * * * *